United States Patent [19]

Tsurukawa et al.

[11] Patent Number: 4,985,719

[45] Date of Patent: Jan. 15, 1991

[54] APPARATUS FOR PREVENTING STATIC ELECTRICITY OF PLASTIC LENS

[75] Inventors: Ikuya Tsurukawa, Yokohama; Kosaku Sawabe, Ichikawa, both of Japan

[73] Assignee: Ricoh Company, Ltd., Tokyo, Japan

[21] Appl. No.: 510,564

[22] Filed: Apr. 18, 1990

[30] Foreign Application Priority Data

Apr. 20, 1989 [JP] Japan .................................. 1-46693
Feb. 22, 1990 [JP] Japan .................................. 2-17171

[51] Int. Cl.$^5$ .............................................. G03B 17/00
[52] U.S. Cl. ..................................... 354/174; 354/202; 354/203; 354/286; 361/212
[58] Field of Search ................ 354/484, 485, 174, 202, 354/203, 286; 361/212, 220

[56] References Cited

U.S. PATENT DOCUMENTS 4,319,821 3/1982 Teyulsa et al. ....................... 354/230

Primary Examiner—Michael L. Gellner
Attorney, Agent, or Firm—Oblon, Spivak, McClelland, Maier & Neustadt

[57] ABSTRACT

An apparatus for preventing static electricity of a plastic lens has the plastic lens coated with a transparent conductive coating; and a conductive member for electrically connecting the coating of the plastic lens to an electric circuit within a camera such that static electricity of the plastic lens is guided to the electric circuit. The preventing apparatus may have a plastic lens coated with a transparent conductive coating; a first electric circuit electrically connected to the coating of the plastic lens through a first conductive member; a conductive pressure plate for pressing a film toward an aperture; a second electric circuit electrically connected to the pressure plate through a second conductive member; a third electric circuit electrically connected through a third conductive member to a magazine attached to a camera; and a device for making the potentials of the magazine, the pressure plate and the plastic lens equal to each other. The preventing apparatus may have another structure for preventing the static electricity of a plastic lens.

10 Claims, 9 Drawing Sheets

APPARATUS FOR PREVENTING STATIC ELECTRICITY OF PLASTIC LENS

BACKGROUND OF THE INVENTION

1. Field of the Invention

The present invention relates to an apparatus for preventing static electricity of a plastic lens in which static electricity charged to the plastic lens, a film and peripheral portions thereof is guided to an electric circuit of a camera so as to effectively prevent dust from being attached by the static electricity to the plastic lens, the film and their peripheral portions, thereby providing an image having a good quality.

2. Description of the Related Art

A plastic lens is generally used in a camera. This plastic lens is attached to a mold frame, etc. formed by an electrically insulated material.

In the camera using such a plastic lens, the plastic lens is in an electrically insulated state.

Accordingly, the plastic lens tends to be charged with static electricity so that dust tends to be attached to the plastic lens.

In particular, in the case of the camera, when a film is supplied, static electricity is generated and therefore the plastic lens and dust generated from the film, a member for preventing leakage of light, etc. are charged with this static electricity. Accordingly, such charged dust and various kinds of dust existing inside and outside the camera are adsorbed onto a face of the plastic lens. Further, the dust absorbed once cannot be easily removed from the plastic lens face.

The following examples are considered as the dust existing inside and outside the camera.

(1) Dust generated from the film in the supply thereof.

(2) Dust generated from planted hair for preventing leakage of light and flare.

(3) Dust such as pieces of cloths left in the camera when the camera is assembled.

(4) Dust generated from a piece of wiping paper when the plastic lens is cleaned.

(5) Dust floating in the air when a rear cover of the camera is opened.

The quality of an image is reduced when such dust are attached onto a face of the plastic lens and especially a lens face near an aperture of the camera.

SUMMARY OF THE INVENTION

It is therefore an object of the present invention to provide an apparatus for preventing static electricity of a plastic lens in which a surface of the plastic lens is prevented from being charged with static electricity and dust can be prevented from being attached to the plastic lens and the dust can be easily removed from the plastic lens by a blower, etc. even when the dust is attached to the plastic lens, thereby providing an image having a good quality.

In a first embodiment of the present invention, the above object can be achieved by an apparatus for preventing static electricity of a plastic lens, comprising the plastic lens coated with a transparent conductive coating; and a conductive member for electrically connecting the coating of the plastic lens to an electric circuit within a camera such that static electricity of the plastic lens is guided to the electric circuit.

In a second embodiment of the present invention, the above object can be achieved by an apparatus for preventing static electricity of a plastic lens, comprising the plastic lens coated with a transparent conductive coating; a first electric circuit electrically connected to the coating of the plastic lens through a first conductive member; a conductive pressure plate for pressing a film toward an aperture; a second electric circuit electrically connected to the pressure plate through a second conductive member; a third electric circuit electrically connected through a third conductive member to a magazine attached to a camera; and means for making the potentials of the magazine, the pressure plate and the plastic lens equal to each other.

In a third embodiment of the present invention, the above object can be achieved by an apparatus for preventing static electricity of a plastic lens, comprising the plastic lens coated with a transparent conductive coating; a first voltage generating circuit electrically connected to the coating of the plastic lens through a first conductive member and applying a predetermined voltage to the coating; a conductive pressure plate for pressing a film toward an aperture; a second voltage generating circuit electrically connected to the pressure plate through a second conductive member and applying a predetermined voltage to the pressure plate; a third voltage generating circuit electrically connected through a third conductive member to a magazine attached to a camera and applying a predetermined voltage to the magazine; and a control circuit for controlling the operations of the first to third voltage generating circuits; the first to third voltage generating circuits respectively judging a control signal from the control circuit and generating an arbitrary voltage.

In the apparatus for preventing static electtricity of a plastic lens in the above first embodiment of the present invention, the conductive member electrically connects the transparent conductive coating to the electric circuit of the camera. Accordingly, the static electricity charged to the plastic lens is guided to the electric circuit of the camera through the coating and the conductive member. Therefore, the plastic lens is not charged with the static electricity and dust is not easily attached onto a surface of the plastic lens.

In the second embodiment of the present invention, the first conductive member electrically connects the transparent conductive coating to the first electric circuit of the camera. Accordingly, the static electricity charged to the plastic lens is guided to the first electric circuit through the coating and the first conductive member. Therefore, the plastic lens is not charged with the static electricity and dust is not easily attached onto a surface of the plastic lens.

Further, since the second conductive member electrically connects the pressure plate to the second electric circuit, the static electricity generated in the pressure plate at the feeding time of the film is guided to the second electric circuit through the second conductive member. Therefore, it is possible to prevent the pressure plate from being charged with the static electricity and dust is not easily attached to the pressure plate. Further, it is possible to prevent dust from being attached to the pressure plate and the plastic lens when the film is supplied, etc.

Further, since the third conductive member electrically connects the magazine to the third electric circuit, the static electricity charged to the magazine is guided to the third electric circuit through the third conductive member. Accordingly, the plastic lens, the pressure plate and the magazine have potentials equal to each other so that it is possible to prevent the magazine from being charged with the static electricity and prevent dust from being attached to the magazine. Therefore, it is possible to prevent the dust from being attached to the plastic lens from this magazine.

In the apparatus for preventing static electricity of a plastic lens in the third embodiment of the present invention, the first to third voltage generating circuits respectively generate predetermined voltages by the operation of the control circuit. The voltage generated in the first voltage generating circuit is applied to the coating of the plastic lens through the first conductive member. The voltage generated in the second voltage generating circuit is applied to the pressure plate through the second conductive member. The voltage generated in the third voltage generating circuit is applied to the magazine through the third conductive member. Thus, it is possible to prevent dust from being attached to the plastic lens, the pressure plate and the magazine. Further, a path for guiding charged floating dust is formed by potential so that no dust is attracted and attached to the plastic lens.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an apparatus for preventing static electricity of a plastic lens in the present invention will next be described in detail with reference to the accompanying drawings.

Figure 1:
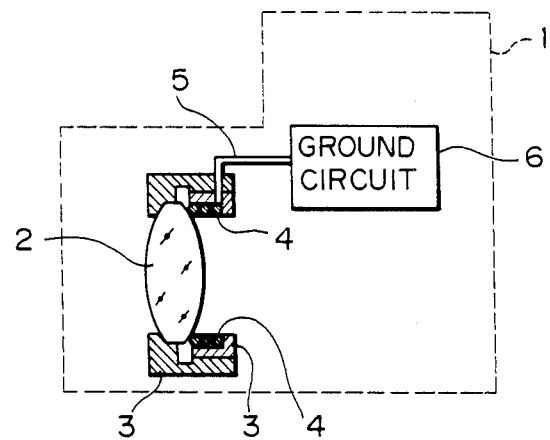
FIG. 1 is a cross-sectional view showing the entire construction of an apparatus for preventing static electricity of a plastic lens in accordance with a first embodiment of the present invention.

FIG. 1 is a cross-sectional view showing the entire construction of an apparatus for preventing static electricity of a plastic lens in a first embodiment of the present invention.

In FIG. 1, an electric circuit for performing various kinds of controls in operation with respect to a camera is disposed on an unillustrated printed board, etc. within a camera body 1. A ground circuit 6 is also disposed on this printed board.

A surface of a plastic lens 2 is coated with a transparent conductive coating.

A peripheral portion of the plastic lens 2 is pressed and held by a body frame 3 through a pressure spring 4. The body frame 3 is attached to the camera body 1 in a predetermined position.

A lead wire 5 as a conductive member is electrically connected between the pressure spring 4 and the ground circuit 6 constituting the electric circuit within the camera body 1.

Accordingly, the transparent conductive coating on the surface of the plastic lens 2 is electrically connected to the ground circuit 6 through the pressure spring 4 and the lead wire 5.

The operation of the above-mentioned preventing apparatus in the first embodiment of the present invention will next be described. The pressure spring 4 presses the plastic lens 2 toward the body frame 3 at any time to strongly hold the plastic lens 2 toward the body frame 3. One end of the pressure spring 4 comes in contact with the transparent conductive coating.

The other end of the pressure spring 4 comes in contact with the lead wire 5 or is connected to this lead wire. The lead wire 5 is connected to the ground circuit 6 of the electric circuit of the camera body 1.

Accordingly, the conductive coating is connected to the ground circuit 6 of the electric circuit of the camera body 1 through the pressure spring 4 and the lead wire 5. Thus, static electricity charged to the plastic lens 2 is guided from the coating to the ground circuit 6 of the electric circuit through the pressure spring 4 and the lead wire 5.

As a result, dust cannot be easily attached by the static electricity to the plastic lens 2. Even when the dust is attached to the plastic lens 2, the dust is not attached by static electricity to the plastic lens so that the dust can be easily removed from the plastic lens by a blower, etc. Therefore, it is possible to prevent the quality of an image photographed to a film from being reduced.

As mentioned above, in accordance with the first embodiment, the plastic lens 2 is coated with the transparent conductive coating and this coating is connected to the ground circuit 6 of the electric circuit of the camera body 1 through the pressure spring 4 and the lead wire 5 such that the static electricity charged to the plastic lens 2 is guided to the ground circuit of the camera body 1. Accordingly, dust is not easily attached onto the plastic lens and an image having a good quality can be obtained.

The present invention is not limited to the above first embodiment, but can be changed in various kinds of modifications within the scope of the features of the invention.

Figure 2:
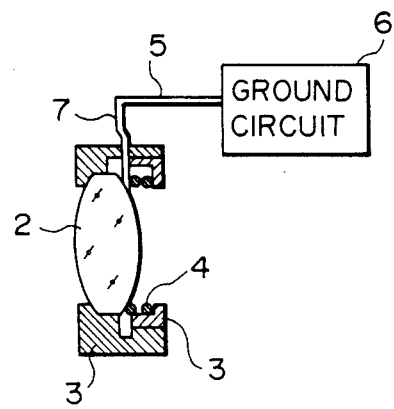
FIGS. 2 to 5 are respectively cross-sectional views showing the construction of an apparatus for preventing static electricity of a plastic lens in accordance with second to fifth embodiments of the present invention.

For example, as illustrated in FIG. 2 showing an apparatus for preventing static electricity of a plastic lens in a second embodiment of the present invention, a leaf spring 7 is connected between a lead wire 5 and a pressure spring 4, thereby constituting a conductive member.

In such a structure, the coating of a plastic lens 2 is electrically connected to the ground circuit 6 through the pressure spring 4, the leaf spring 7 and the lead wire 5. Therefore, similar to the first embodiment in FIG. 1, static electricity charged to the plastic lens 2 is guided from the coating to the ground circuit 6 through the pressure spring 4, the leaf spring 7 and the lead wire 5.

Accordingly, dust is not easily attached by static electricity to the plastic lens 2. Even when the dust is attached to the plastic lens, the dust can be easily removed from the plastic lens by a blower, etc. and an image having a good quality is obtained.

Figure 3:
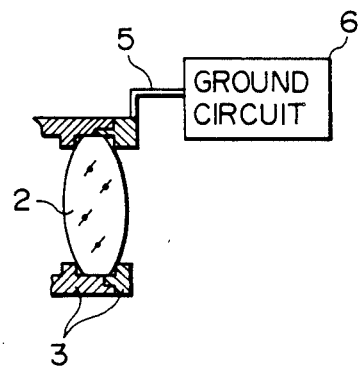

FIG. 3 is a cross-sectional view showing an apparatus for preventing static electricity of a plastic lens in a third embodiment of the present invention. In FIG. 3, a body frame 3 is formed by a conductive member and a plastic lens 2 having a coating thereon similar to that in the above first and second embodiments is fitted to the body frame 3. Further, one end of a lead wire 5 is connected or buried into the body frame 3 and the other end of the lead wire 5 is connected to a ground circuit 6 within the camera body.

In this case, the pressure spring 4 shown in each of FIGS. 1 and 2 is omitted, but static electricity charged on a surface of the plastic lens 2 is guided from the coating to the ground circuit 6 through the body frame 3 and the lead wire 5.

Accordingly, dust is not attached by static electricity to the plastic lens 2 and an image having a good quality is obtained.

Figure 4:
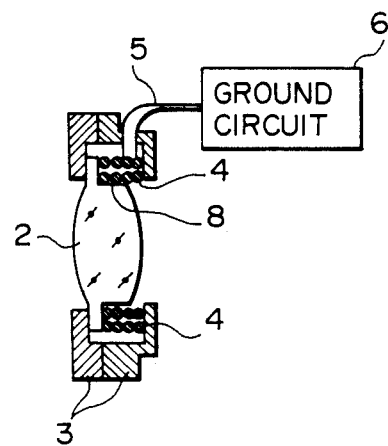

FIG. 4 is a cross-sectional view showing an apparatus for preventing static electricity of a plastic lens in a fourth embodiment of the present invention.

In FIG. 4, a peripheral portion of a plastic lens 2 is held by a body frame 3 through a pressure spring 4 and a conductive paint 8 is painted in a predetermined position of the plastic lens 2 in the vicinity of the body frame 3.

One end of the pressure spring 4 comes in contact with this conductive paint 8 and the other end of the pressure spring 4 is connected to the ground circuit 6 of the camera body through the lead wire 5.

In such a structure, a peripheral portion of the plastic lens 2 on a face thereof is electrically connected from the conductive paint 8 to the ground circuit 6 through the pressure spring 4 and the lead wire 5 so that this peripheral portion has the same potential as that of the ground circuit 6. Accordingly, the plastic lens 2 is not easily charged with static electricity and no dust is attached to the plastic lens 2.

Figure 5:
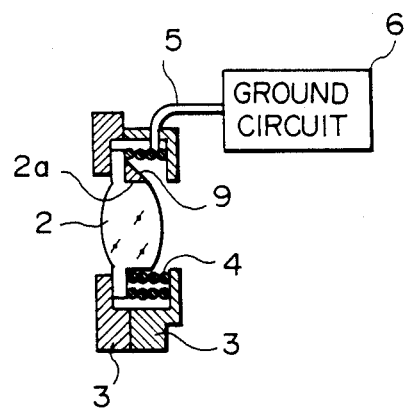

FIG. 5 is a cross-sectional view showing an apparatus for preventing static electricity of a plastic lens in a fifth embodiment of the present invention. In FIG. 5, a plastic lens 2 is coated with a coating similar to that in the embodiments in FIGS. 1 to 3 and a peripheral portion of the plastic lens 2 is partially cut off such that a rib 9 is left to form a step portion 2a. Since the coating is disconnected by forming the step portion 2a in the plastic lens 2, the rib 9 is extended from a lens face toward the peripheral portion of the plastic lens such that no disconnected portion of the coating is formed.

The plastic lens 2 is held by a body frame 3 in a state in which a pressure spring 4 comes in contact with the step portion 2a electrically connected to the coating formed on a surface of the plastic lens 2 through the rib 9.

One end of a lead wire 5 comes in contact with the pressure spring 4 and the other end of the lead wire 5 is connected to a ground circuit 6 of the camera body.

Accordingly, the coating of the plastic lens 2 is electrically connected to the ground circuit 6 through the rib 9, the pressure spring 4 and the lead wire 5. The step portion 2a of the plastic lens 2 has the same potential as that of the ground circuit 6. Therefore, similar to the embodiment of FIG. 4, it is possible to prevent the plastic lens 2 from being charged with static electricity.

Figure 6:
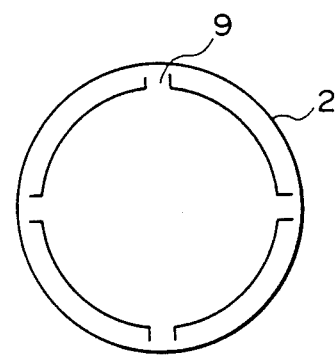
FIG. 6 is a plan view of a rib applied to the fifth embodiment of FIG. 5.
Figure 7:
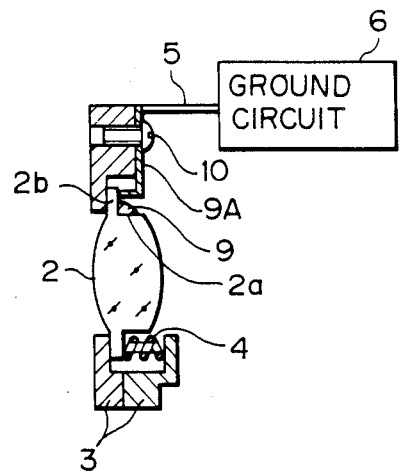
FIGS. 7 and 8 are respectively cross-sectional views showing the construction of an apparatus for preventing static electricity of a plastic lens in accordance with sixth and seventh embodiments of the present invention.

FIG. 7 is a cross-sectional view showing an apparatus for preventing static electricity of a plastic lens in a sixth embodiment of the present invention. In FIG. 7, a plastic lens 2 is coated with a coating similar to that in the embodiments of FIGS. 4 and 5 and a peripheral portion of the plastic lens 2 is partially cut off to form a step portion 2a. Further, a rib 9 similar to that in the embodiment of FIG. 6 is formed in this step portion 2a.

This rib 9 is formed to have no disconnected portion between the coating on a lens surface and the coating in the step portion 2a as mentioned above.

A screw hole is formed in the vicinity of a peripheral portion of the body frame 3. A set screw 10 is inserted into a hole disposed in a central portion of a leaf spring 9A approximately formed in the shape of a crank and is screwed into this screw hole so that the lead spring 9A is attached to the body frame 3. One end of the leaf spring 9A is pressed by a flange portion 9b of the plastic lens 2 and the other end of the lead spring 9A is connected to a ground circuit 6 through a lead wire 5.

Thus, the coating on the face of the plastic lens 2 is electrically connected to the rib 9 and the coating of the flange portion 2b of the plastic lens 2. Further, the coating of the flange portion 2b is electrically connected to the ground circuit 6 through the leaf spring 9A and the lead wire 5. Accordingly, static electricity charged to the plastic lens 2 flows to the ground circuit 6 so that it is possible to prevent dust from being attached to the plastic lens 2 by the static electricity and prevent the quality of photographed image from being reduced.

Figure 8:
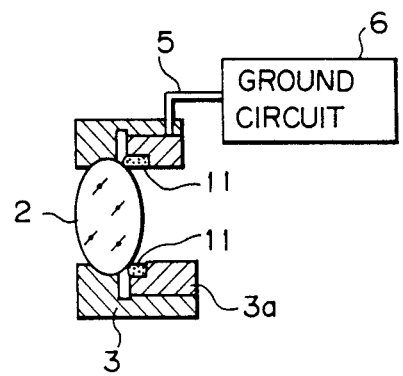

FIG. 8 is a cross-sectional view showing an apparatus for preventing static electricity of a plastic lens in a seventh embodiment of the present invention. In FIG. 8, a conductive frame 3a has large and small holes in diameter and an L-shape in cross section and is screwed into a body frame 3. A conductive rubber 11 is fitted into the large hole of this conductive frame 3a. This conductive rubber 11 is supported between the conductive frame 3a and an inner circumferential face of a plastic lens 2 fitted to the body frame 3.

One end of a lead wire 5 is buried into the body frame 3 to electrically connect this one end to the conductive frame 3a. The other end of the lead wire 5 is connected to a ground circuit 6.

In such a structure, a coating of the plastic lens 2 is electrically connected to the ground circuit 6 through a path composed of the conductive rubber 11, the conductive frame 3a and the lead wire 5. Accordingly, static electricity charged to the plastic lens 2 flows to the ground circuit 6 through this path so that it is possible to prevent dust from being attached to the plastic lens 2 by the static electricity.

Figure 9:
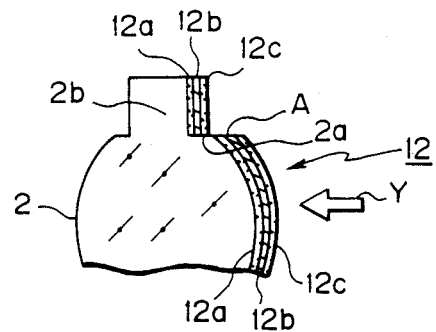
FIG. 9 is an enlarged cross-sectional view showing the plastic lens illustrated in each of FIGS. 1 to 8 in the vicinity of a flange portion thereof and explaining the construction of a conductive coating coated on the plastic lens.

The transparent conductive coating in each of the embodiments in FIGS. 1 to 8 is constructed by a three layer structure composed of a first layer oxide film 12a made of $SiO_2$, a conductive film 12b and a second layer oxide film 12c made of $SiO_2$ as illustrated by an enlarged cross-sectional view showing a portion of the plastic lens 2 in FIG. 9. These coating films are formed by evaporation.

As in the embodiments shown in FIGS. 1 to 3 and 8, when the outer size of the plastic lens 2 is larger than an effective diameter thereof, it is possible to connect the coating 12 coated in a main portion of the plastic lens 2 to the ground. However, when the outer size of the plastic lens 2 is not larger than the effective diameter thereof, there is a case in which it is not possible to directly connect a lens face to the ground. In this case, as in the embodiments shown in FIGS. 4, 5 and 7, the coating of the flange portion 2b is connected to the ground. However, as shown in FIG. 9, when the flange portion 2b is formed, the film 12 (the evaporated film) is coated in a direction perpendicular to a face of the lens 2 as shown by arrow Y and is not coated on a face A of the step portion 2a.

Accordingly, it is necessary to electrically connect the coating of the flange portion 2b and the coating on the lens face to each other. In the above embodiment in FIG. 4, a conductive paint 8 is painted to electrically connect the coating of the flange portion 2b to the coating on the lens face, as can be seen from FIG. 10 enlarging a portion of the preventing apparatus near the flange portion 2b.

Figure 11:
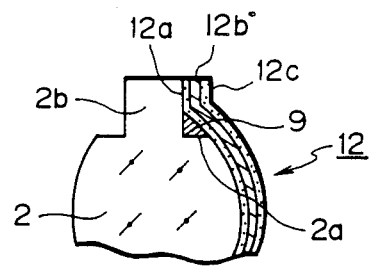
FIG. 11 is an enlarged cross-sectional view exaggeratedly showing a peripheral portion of the plastic lens shown in FIG. 5 to explain the construction of a conductive coating of the plastic lens.

In the case of the embodiment in FIG. 5, a coating 12 is also coated on a slanting face of the rib 9 from the lens face to the flange portion 2b, as can be seen from FIG. 11 enlarging a portion of the preventing apparatus near the flange portion 2b. The coatings with respect to the flange portion 2b and the lens face are thus electrically connected to each other through the coating 12.

Figure 10:
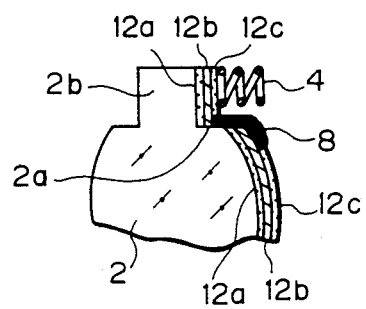
FIG. 10 is an enlarged cross-sectional view showing the plastic lens illustrated in FIG. 4 in the vicinity of a flange portion thereof and explaining the connection relation between conductive paint and coating of the plastic lens.

In the three coating layer structure in which the coating 12 is composed of the first layer oxide film 12a made of $SiO_2$, the conductive film 12b and the second layer oxide film 12c made of $SiO_2$ as shown in FIGS. 9 to 11, a surface of the second layer oxide film 12c made of $SiO_2$ is hard so that the second layer oxide film 12c is not partially broken when a metallic piece slightly comes in contact with the second layer oxide film 12c. Accordingly, there is a possibility that the pressure spring 4 is not electrically connected to the conductive film 12b in the embodiment of FIG. 5.

To electrically connect the pressure spring 4 to the conductive film 12b, it is necessary to press the second layer oxide film 12c by force at a predetermined level sufficient to break the second layer oxide film 12c.

When the conductive paint 8 is painted in the embodiment of FIG. 4, the conductive film 12b and the conductive paint 8 are electrically connected to each other through a small pin hole formed in the second layer oxide film 12c made of $SiO_2$.

Figure 12:
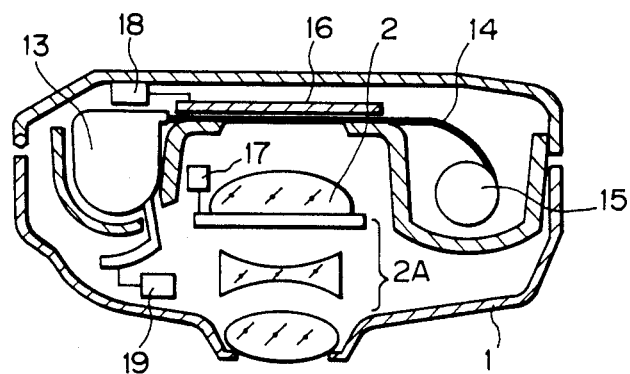
FIG. 12 is a transversal cross-sectional view showing the construction of an apparatus for preventing static electricity of a plastic lens in an eight embobodiment of the present invention.

FIG. 12 is a plan view showing an apparatus for preventing static electricity of a plastic lens in an eighth embodiment of the present invention. In this figure, a film 14 is pulled out of a magazine 13 disposed in a camera body 1 and is inserted into a winding spool 15 and is wound around the winding spool 15.

A pressure plate 16 is disposed between the magazine 13 and the winding spool 15 and presses the film 14 toward a guide rail disposed in the vicinity of an aperture. The pressure plate 16 is attached into the camera body 1 through an unillustrated pressure plate spring. This pressure plate 16 may be formed by an electric conductor or may be formed by painting a conductive paint, etc. on a nonconductive body made of plastic, etc.

A photographing lens 2A is arranged in a central portion of the camera body 1. The plastic lens 2 shown in each of the abovementioned embodiments is arranged backward from at least this photographing lens 2A. As shown in FIGS. 9 to 11, the plastic lens 2 is coated with a transparent conductive coating.

A first conductive member 17 is connected between the coating of the plastic lens 2 and an unillustrated first electric circuit. The first conductive member 17 is preferably constructed by the pressure spring 4, the lead wire 5, etc. as shown in FIGS. 1, 2, 4 and 5.

The pressure plate 16 is connected to an unillustrated second electric circuit through a second conductive member 18. This second conductive member 18 may be constructed by partially using the lead wire or a constructional member of the camera body 1.

Figure 13:
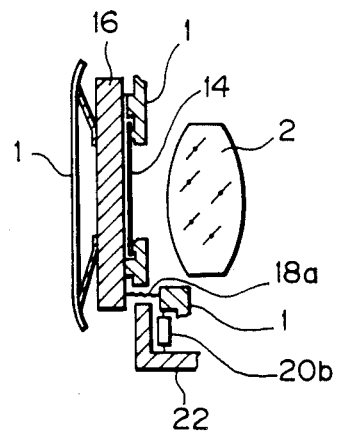
FIG. 13 is a longitudinal cross-sectional view for exaplaining the connection relation between a conductive pressure plate and an electric circuit in the preventing apparatus in the embodiment shown in FIG. 12.

FIG. 13 shows an example in which the pressure plate 16 is connected to the second electric circuit through the second conductive member 18.

As shown in FIG. 13, a spring 18a is disposed between the camera body 1 and a face of the pressure plate 16 coming in contact with the film 14. One end of the spring 18a is connected onto a ground line 22 on a printed board through the second electric circuit 20b.

Thus, the pressure plate 16 is electrically connected to the second electric circuit 20b through the spring 18a.

Further, the magazine 13 is connected to an unillustrated third electric circuit through a third conductive member 19 constructed by a lead wire, etc.

The first to third electric circuits have potentials equal to each other and are preferably constructed by a ground circuit, etc. on the printed board disposed within e.g., the camera body 1.

In such a structure, static electricity charged to the plastic lens 2 is guided to the first electric circuit through the first conductive member 17 so that dust is not easily attached by the static electricity onto the plastic lens 2.

When the film 14 is supplied, the film 14 comes in slide contact with the pressure plate 16 in a state in which the film 14 is pressed between the pressure plate 16 and an aperture portion of the camera body 1. Accordingly, static electricity tends to be caused with respect to both the film 14 and the pressure plate 16. However, the conductive pressure plate 16 is connected to the second electric circuit 20b through the spring 18a of the second conductive member 18. Therefore, the static electricity charged with respect to the pressure plate 16 is guided to the second electric circuit 20b through the spring 18a of the second conductive member 18 and then flows onto the ground line 22.

Thus, no dust is attached by static electricity onto the pressure plate 16 and the dust floating between the pressure plate 16 and the plastic lens 2 is not easily attached to the plastic lens 2 and the pressure plate 16.

Further, the magazine 13 is also connected to the third electric circuit through the third conductive member 19. Therefore, even when the static electricity of the film 14 charged by friction between the film 14 and a light-interrupting member of the magazine 13, or between the film 14 and the pressure plate 4 at the feeding time of the film, etc. is transmitted to the magazine 13, the static electricity of the magazine 13 is guided to the third electric circuit through the third conductive member 19 so that the cartridge 13 has no static electricity.

Thus, the plastic lens 2, the magazine 13, the film 14 and the pressure plate 16 are not easily charged with static electricity. Therefore, it is possible to prevent dust from being attached to these members by the static electricity so that the quality of an image is not reduced.

As mentioned above, dust is not easily attached onto a face of the plastic lens 2. Even when the dust is attached onto a face of the plastic lens 2, the dust is not attached onto this lens face by a suction force of static electricity. Accordingly, the attaching force of the dust is weak and the dust can be easily removed from the lens face by natural drop, a blower, etc.

Figure 14:
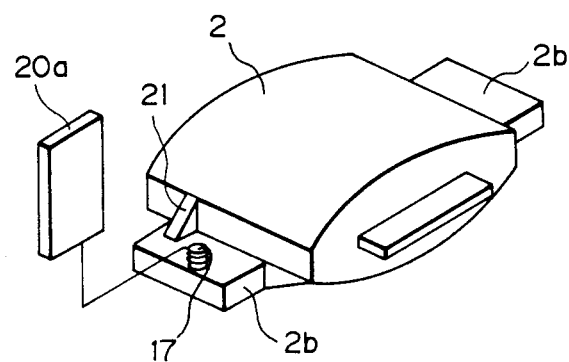
FIG. 14 is a perspective view showing the construction of an apparatus for preventing static electricity of a plastic lens in a ninth embodiment of the present invention.

FIG. 14 is a perspective view showing an apparatus for preventing static electricity of a plastic lens in a ninth embodiment of the present invention. In this embodiment of FIG. 14, a step portion is disposed between a flange portion 2b and a face of the plastic lens 2 disposed in the camera body 1 in FIG. 12.

Figure 15:
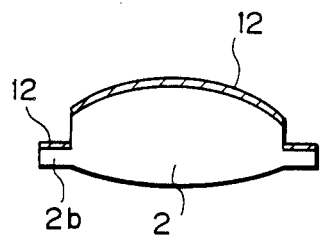
FIG. 15 is a cross-sectional view showing an interrupted state of a coating between a lens face and a flange portion of the plastic lens in the embodiment of FIG. 14.
Figure 16:
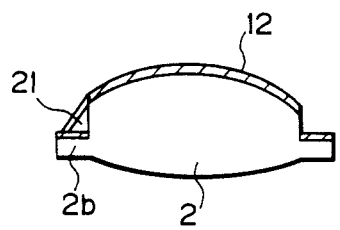
FIG. 16 is a cross-sectional view showing a state in which this coating interruption is avoided by disposing a rib between the lens face and the flange portion in FIG. 15.

FIG. 14 shows an example in which a portion for connecting a first electric circuit 20a to a first conductive member 17 is disposed in the flange portion 2b. Since the step portion shown in FIG. 15 is disposed between the lens face and the flange portion 2b, the above conductive coating 12 is interrupted between the lens face and the flange portion 2b. Therefore, as shown in FIG. 16, a rib 21 is disposed to electrically connect the lens face to the conductive coating 12 of the flange portion 2b.

Since this rib 21 is disposed, there is no substantial interruption of the conductive coating 12 so that the coating 12 is easily connected electrically to the first electric circuit 20a. The static electricity charged on the lens face is guided to the first electric circuit 20a through the coating 12 on the lens face, the rib 21, the coating of the flange portion 2b, and the first conductive member 17 such as the pressure spring, the lead wire, etc. Thus, the plastic lens 2 has no static electricity and it is possible to prevent dust from being attached to the plastic lens 2.

Figure 17:
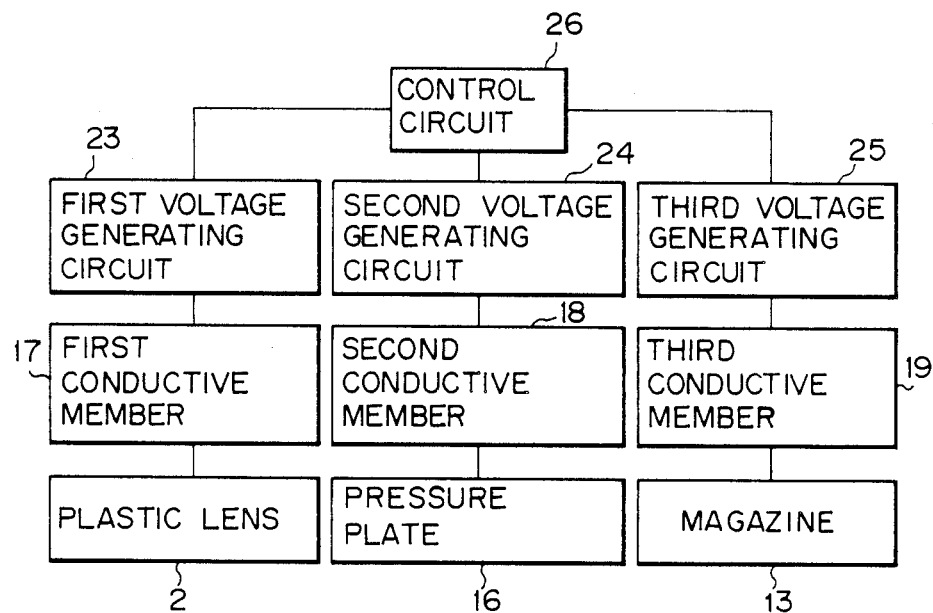
FIG. 17 is a block diagram showing the construction of an apparatus for preventing static electricity of a plastic lens in a tenth embodiment of the present invention.

FIG. 17 is a block diagram showing the construction of an apparatus for preventing static electricity of a plastic lens in a tenth embodiment of the present invention. In FIG. 17, a coating of a plastic lens 2 is connected to a first voltage generating circuit 23 through a first conductive member 17.

Similarly, a conductive pressure plate 16 is connected to a second voltage generating circuit 24 through a second conductive member 18. A magazine 13 is connected to a third voltage generating circuit 25 through a third conductive member 19.

These first to third voltage generating circuits 23 to 25 are connected to a control circuit 26. These voltage generating circuits 23 to 25 generate respective predetermined voltages by a control signal outputted from the control circuit 26.

The arrangement relation with respect to the above plastic lens 2, the pressure plate 16, the magazine 13 and the first to third conductive members 17 to 19 within the camera body 1 is similar to that described in the above-mentioned eighth embodiment of the present invention shown in FIG. 12. Therefore, this arrangement relation is not shown in the drawings.

In this tenth embodiment of the present invention, the connection relation with respect to the second conductive member 18 for connecting the pressure plate 16 and the second voltage generating circuit 24 is similar to that shown in FIG. 13 except that the second electric circuit 20b in the eighth embodiment shown in FIG. 13 is replaced by the second voltage generating circuit 24. Therefore, this connection relation is also not shown in the drawings.

As mentioned above, the flange portion 2b is disposed in the plastic lens 2. Therefore, similar to the embodiment shown in FIG. 14, when a step portion is formed between this flange portion 2b and a face of the plastic lens 2, a rib 21 is disposed to prevent the electric disconnection between the flange portion 2b and the coating 12 on the lens face caused by this step portion, as shown in FIGS. 14 to 16.

The operation of the apparatus for preventing static electricity of a plastic lens in FIG. 17 will next be described. The control circuit 26 outputs a control signal to each of the first to third voltage generating circuits 23 to 25 so as to generate a predetermined voltage.

The voltage generated in the first voltage generating circuit 23 is thus applied to the coating of the plastic lens 2 through the first conductive member 17.

The voltage generated in the second voltage generating circuit 24 is applied to the pressure plate 16 through the second conductive member 18. Similarly, the voltage generated in the third voltage generating circuit 25 is applied to the magazine 13 through the third conductive member 19.

In this case, for example, when a minus (−) voltage is generated by the control circuit 26 in the first voltage generating circuit 23 and is applied to the plastic lens 2 through the first conductive member 17, no dust having minus charge is attached to the plastic lens 2.

Similarly, if dust having minus charge is floating in the vicinity of each of the pressure plate 16 and the magazine 13, a minus voltage is applied to the pressure plate 16 and the magazine 13 through the second conductive member 18 and the third conductive member 19 from the second voltage generating circuit 24 and the third voltage generating circuit 25, respectively. Thus, the above dust having minus charge is not attached to the pressure plate 16 and the magazine 13.

For example, a plus (+) voltage is generated by the control signal of the control circuit 26 from the third voltage generating circuit 25 and is applied to the magazine 13 through the third conductive member 19. Further, a minus (−) voltage is generated from the first voltage generating circuit 23 and is applied to the plastic lens 2 through the first conductive member 17. In such a case, no dust having minus charge is attached to the plastic lens 2 so that it is possible to prevent the quality of an image from being reduced.

As mentioned above, an equal potential or a predetermined voltage is applied to the plastic lens 2, the pressure plate 16 and the magazine 13 from the first to third voltage generating circuits 23 to 25, respectively. Accordingly, it is possible to make an environment in which the plastic lens 2, the pressure plate 16, the magazine 13 and the film are not charged with static electricity when the film is supplied, etc.

Therefore, a path for guiding charged floating dust is made by the voltages respectively outputted from the first to third voltage generating circuits 23 to 25 so that it is possible to prevent the dust from being attached to the plastic lens 2.

In each of the above embodiments, the coating is formed to be conductive, but similar effects can be obtained by forming a so-called multi-coating in which more than two coatings are formed to reduce reflection of light on a surface of the plastic lens 2 and increase the transmitting amount of light in a lens system.

As mentioned above, in accordance with an apparatus for preventing static electricity of a plastic lens in a first embodiment of the present invention, a plastic lens surface is coated with a transparent conductive coating and this coating is connected to an electric circuit of a camera body through a conductive member so that static electricity charged to the plastic lens is transmitted to e.g., a ground circuit of the electric circuit. Therefore, it is possible to prevent the plastic lens from being charged with static electricity by a simple construction. Thus, no dust is attached to the plastic lens by static electricity. Further, even when dust is attached to the plastic lens, the dust can be easily removed from the plastic lens and an image having a good quality can be obtained.

In a second embodiment of the present invention, the plastic lens, the conductive pressure plate and the magazine are respectively connected to the first to third electric circuits through the first to third conductive members such that the plastic lens, the conductive pressure plate and the magazine have an equal potential. Accordingly, dust is not easily attached to the plastic lens, the pressure plate and the magazine and static electricity is not easily generated with respect to the film. Thus, the dust attached to the film is not easily attached to the plastic lens. Even when the dust is attached to the plastic lens, the dust can be easily removed by a blower, etc. from the plastic lens since this dust is not attached to the plastic lens by static electricity.

Accordingly, it is possible to provide an apparatus for preventing static electricity of a plastic lens in which the reduction of an image quality can be restrained.

In an apparatus for preventing static electricity of a plastic lens in a third embodiment of the present invention, the plastic lens, the conductive pressure plate and the cartridge are respectively connected to the first to third voltage generating circuits through the first to third conductive members. A control signal of the control circuit is supplied to each of the first to third voltage generating circuits and is judged to generate predetermined voltages. These predetermined voltages are respectively applied to the plastic lens, the pressure plate and the magazine. Accordingly, it is possible to easily remove the static electricity from the charged plastic lens, film and peripheral portions thereof. Therefore, it is possible to prevent dust from being attached to the plastic lens so that the reduction of an image quality can be effectively prevented.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for preventing static electricity of a plastic lens, comprising:
   the plastic lens coated with a transparent conductive coating; and
   a conductive member for electrically connecting said coating of the plastic lens to an electric circuit within a camera such that static electricity of said plastic lens is guided to said electric circuit.

2. A preventing apparatus as claimed in claim 1, wherein the static electricity charged to the plastic lens is guided to the electric circuit of the camera through the coating and the conductive member.

3. An apparatus for preventing static electricity of a plastic lens, comprising:
   the plastic lens coated with a transparent conductive coating;
   a first electric circuit electrically connected to said coating of the plastic lens through a first conductive member;
   a conductive pressure plate for pressing a film toward an aperture;
   a second electric circuit electrically connected to said pressure plate through a second conductive member;
   a third electric circuit electrically connected through a third conductive member to a magazine attached to a camera; and
   means for making the potentials of said magazine, said pressure plate and said plastic lens equal to each other.

4. A preventing apparatus as claimed in claim 3, wherein static electricity charged to the plastic lens is guided to the first electric circuit through the coating and the first conductive member.

5. A preventing apparatus as claimed in claim 4, wherein the static electricity generated in the pressure plate at a feeding time of the film is guided to the second electric circuit through the second conductive member.

6. A preventing apparatus as claimed in claim 5, wherein the static electricity charged to the magazine is guided to the third electric circuit through the third conductive member.

7. An apparatus for preventing static electricity of a plastic lens, comprising:
   the plastic lens coated with a transparent conductive coating;
   a first voltage generating circuit electrically connected to said coating of the plastic lens through a first conductive member and applying a predetermined voltage to said coating;
   a conductive pressure plate for pressing a film toward an aperture;
   a second voltage generating circuit electrically connected to said pressure plate through a second conductive member and applying a predetermined voltage to said pressure plate;
   a third voltage generating circuit electrically connected through a third conductive member to a magazine attached to a camera and applying a predetermined voltage to said cartridge; and a control circuit for controlling the operations of said first to third voltage generating circuits;

said first to third voltage generating circuits respectively judging a control signal from said control circuit and generating an arbitrary voltage.

8. A preventing apparatus as claimed in claim 7, wherein the voltage generated in the first voltage generating circuit is applied to the coating of the plastic lens through the first conductive member.

9. A preventing apparatus as claimed in claim 8, wherein the voltage generated in the second voltage generating circuit is applied to the pressure plate through the second conductive member.

10. A preventing apparatus as claimed in claim 9, wherein the voltage generated in the third voltage generating circuit is applied to the magazine through the third conductive member.

* * * * *